United States Patent [19]

Niwa et al.

[11] Patent Number: 4,624,501
[45] Date of Patent: Nov. 25, 1986

[54] SLIDING ROOF DEVICE FOR AUTOMOBILES

[75] Inventors: Toshiaki Niwa, Asaka; Yukichi Inada, Yotsukaichi, both of Japan

[73] Assignee: Honda Giken Kogyo Kabushiki Kaisha, Tokyo, Japan

[21] Appl. No.: 621,111

[22] Filed: Jun. 15, 1984

[30] Foreign Application Priority Data

Jun. 22, 1983 [JP] Japan .............................. 58-96460[U]

[51] Int. Cl.⁴ .............................................. B60J 7/047
[52] U.S. Cl. .................................... 296/222; 296/216; 296/224
[58] Field of Search .......... 296/216, 218, 219, 220–223

[56] References Cited

U.S. PATENT DOCUMENTS

| 4,114,945 | 9/1978 | Lutz | 296/216 |
| 4,407,541 | 10/1983 | Boots | 296/221 |
| 4,475,767 | 10/1984 | Grimm et al. | 296/222 |

FOREIGN PATENT DOCUMENTS

| 3138114 | 4/1983 | Fed. Rep. of Germany . |
| 3311478 | 10/1983 | Fed. Rep. of Germany | 296/222 |
| 8013895 | 4/1981 | France . |
| 2529516 | 1/1984 | France . |
| 2068304 | 7/1980 | United Kingdom . |
| 2078295 | 1/1982 | United Kingdom . |
| 2114212 | 8/1983 | United Kingdom | 296/222 |

Primary Examiner—Randolph A. Reese
Assistant Examiner—Dennis H. Pedder
Attorney, Agent, or Firm—Birch, Stewart, Kolasch & Birch

[57] ABSTRACT

A sliding roof device for a vehicle having a roof with an opening being disposed therein and including a sliding roof operatively positioned to close the opening in the roof of the vehicle, the sliding roof having an upper face and a lower face. A roof frame is provided with frame side guide rails which are mounted on the roof frame. Slide stays are secured to the lower face of the sliding roof. Moving members are attached to the slide stays and are operatively positioned to be movable back and forth along the frame side guide rails wherein upwardly tilting a rear portion of the sliding roof and displacing the sliding roof to a roof back position with the moving members being guided along the frame side guide rails varies the angle of inclination of the sliding roof relative to said frame side guide rails. In addition, an elastic member is operatively positioned between the sliding roof and the roof frame and is compressed by the sliding roof when the roof is fully opened to push and bias the sliding roof upwardly.

6 Claims, 7 Drawing Figures

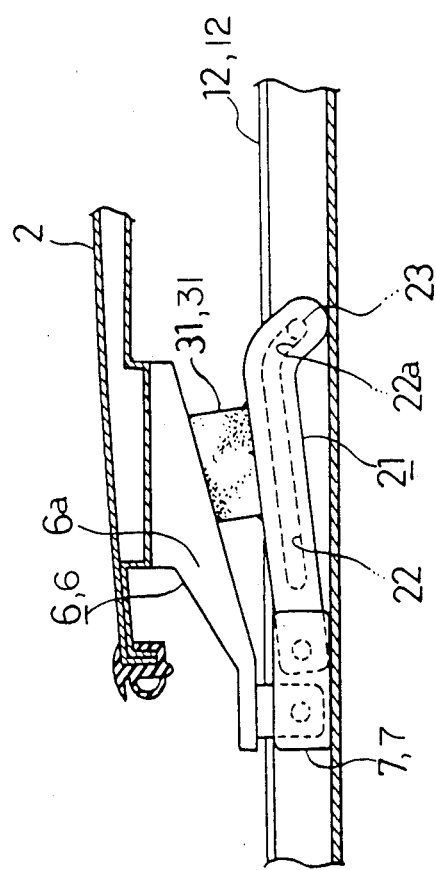

SLIDING ROOF DEVICE FOR AUTOMOBILES

BACKGROUND OF THE INVENTION

Field of the Invention

The present device relates to a sliding roof device for a vehicle, such as an automobile.

In a vehicle having a roof and an opening disposed in the roof, a sliding roof device is constructed such that the rear portion of a sliding roof is moved up or down and is then slid to above or below the roof through a variety of guides thereby to position the sliding roof in an open position to expose the roof opening. However, in the fully open state the sliding roof may chatter due to the clearances between the various members which is caused by wind resistance when the automobile is running or in motion.

The present device has been conceived so as to eliminate the aforementioned disadvantage and has an object to prevent the sliding roof device from chattering when its sliding roof is fully open.

The Assignee of the present invention has already filed Japanese Patent Application Nos. 57-115271 Publication No. 59-6126 and 57-115275, Publication No. 59-6129 which disclose external slide type sliding roof devices for moving a sliding roof to above a roof line by tilting up the rear portion of the sliding roof and by subsequently changing the angle of inclination. Therefore, an object of the present invention is to provide a stronger structure especially for an external slide type sliding roof device in its fully open state thereby to prevent or reduce chattering of the device in the fully open state.

In order to achieve the aforementioned object, according to the present invention, there is provided a sliding roof device for a vehicle, such as an automobile, which includes a sliding roof enabled to close a roof opening, frame side guide rails arranged on a roof frame and moving members attached to slide stays depending from the lower face of the sliding roof and made movable back and forth along the frame side guide rails. In this manner, after the rear portion of the sliding roof is upwardly tilted the sliding roof is moved to the roof back position while having its angle of inclination varied. An elastic member is adapted to be compressed by the sliding roof, when the roof is fully opened, to push and bias the sliding roof upward.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a side view showing the compressed state of the elastic member in the vicinity of the fully open state of the sliding roof.

DETAILED DESCRIPTION OF THE INVENTION

Figure 1:
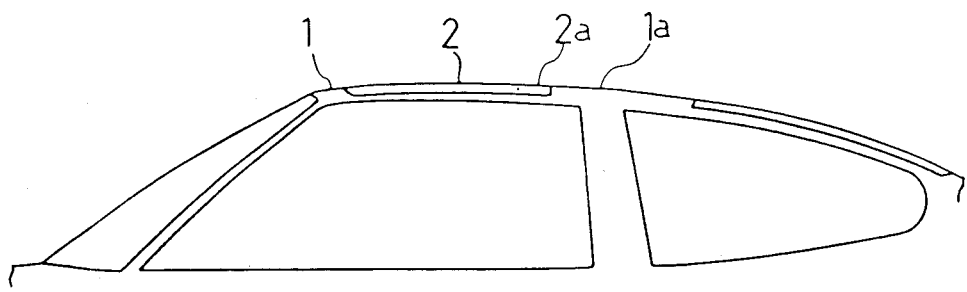
FIGS. 1 to 3 are side views showing the appearances of the sliding roof in the fully closed, tilted-up and fully open states, respectively.
Figure 2:
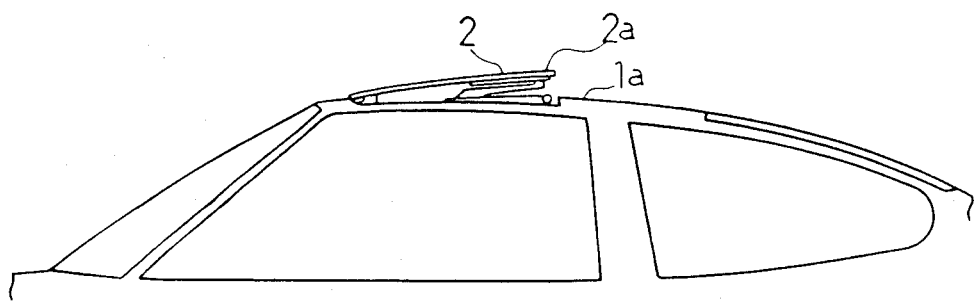
Figure 3:
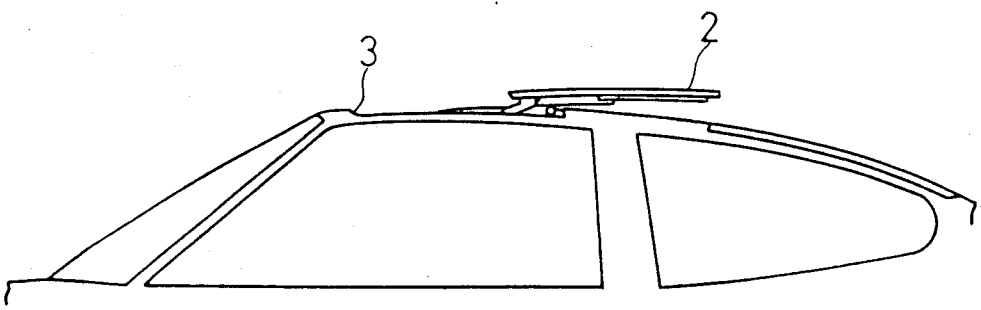

A roof 1 and a sliding roof 2 are positioned on the top of a vehicle. The sliding roof 2 is operatively mounted to close a roof opening 3 and to open an automotive compartment to the atmosphere through the roof opening 3 and an opening defined by a roof lining 4 when the rear portion 2a of the sliding roof 2 is tilted up, as shown in FIG. 2, and is then moved to above a roof back 1a, as shown in FIG. 3.

A pair of roof side guide rails 5 which extend from the intermediate portion to the rear portion of the sliding roof 2 are disposed at both sides of the lower face of the aforementioned sliding roof 2. A pair of front slide stays 6 and 6 are provided to depend from both of the sides of the front end portion of the lower face of the sliding roof 2.

The aforementioned front slide stays 6 are formed with arms 6a which protrude obliquely in the forward direction. A slider 7 is attached to the lower ends of the front portions of the arms 6a.

On the periphery of the aforementioned opening, there is arranged a frame member 11 of a thin plate, on which a pair of main guide rails 12 and 12 are arranged to face the two sides of the opening and are adapted to fit the aforementioned sliders 7 which are slidable thereon. The main guide rails 12 are positioned such that their rear portions are at a higher level than their front portions.

Inside of the aforementioned main guide rails 12, there are arranged a pair of frame side sub guide rails 14 which extend from the generally middle portions to the rear portions of both the sides of the roof opening and which have their front ends connected to hinges 13. The vertical rocking motions of the frame side sub guide rails 14 on their front ends are effected by the action of a tilt-up mechanism 15 which is arranged below the roof back 1a.

Figure 5:
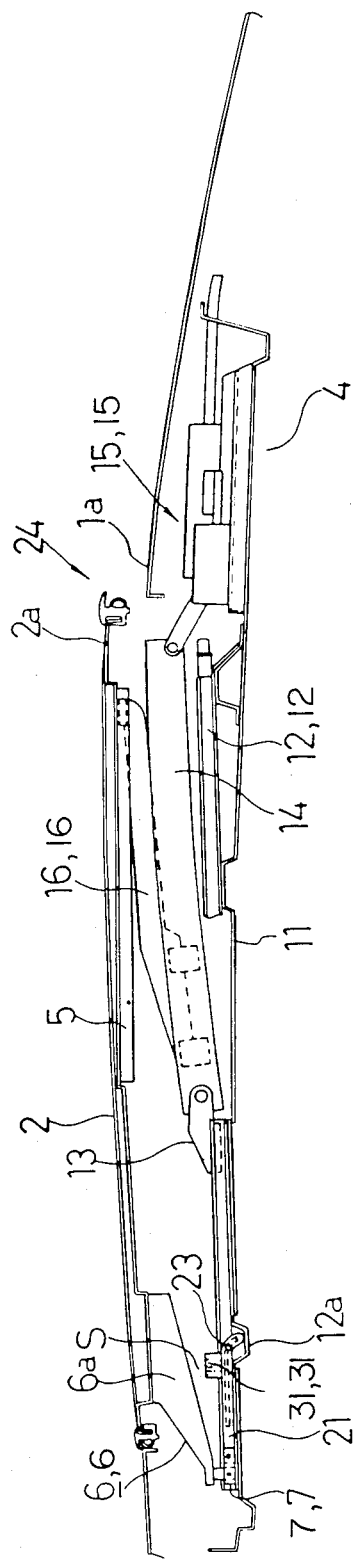
Figure 6:
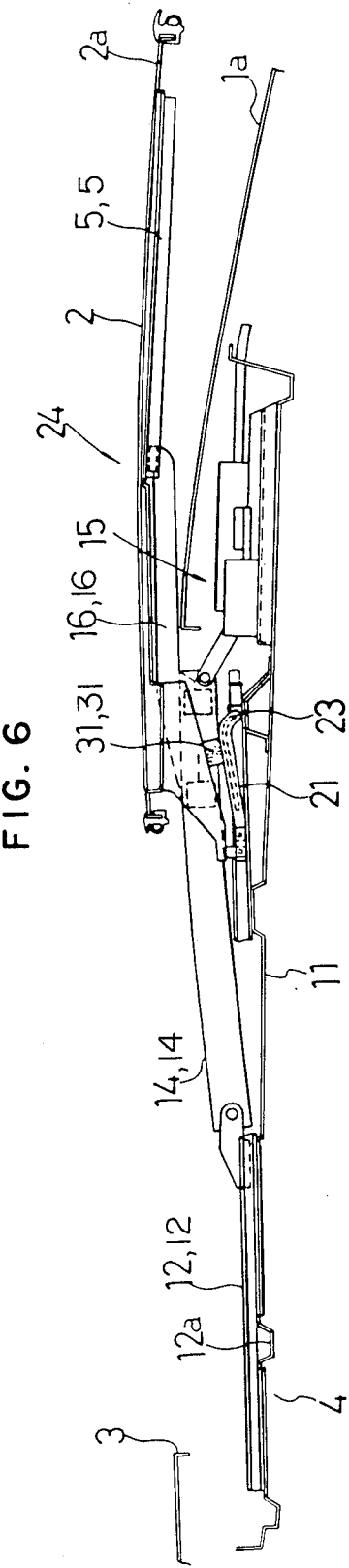

Between the aforementioned roof side guide rails 5 and 5 and sub guide rails 14 and 14, there are mounted rear slide stays 16 which are elongated to have their rear and front ends fitted slidably on the roof side guide rails 5 and the sub guide rails 14, respectively. The rear slide stays 16 being guided along said sub guide rails 14 and being inclined at an angle to be rearwardly elevated when the sliding roof 2 is in the tilted position. As illustrated in FIG. 5, the sub guide rails 14 are arcuately formed to curve upwardly.

To the rear end of the aforementioned slider 7, as shown in FIG. 7, there is hinged the front end of a link member 21 which is elongated in the longitudinal direction.

The aforementioned link member 21 is formed with a guide groove 22, in which such a slide pin 23 is fitted as is connected to and made longitudinally movable with a drive cable adapted to run longitudinally along the main guide rails 12. When the slide pin 23 comes into engagement with the bent rear end portion 22a of the aforementioned guide groove 22, the link member 21 is made movable back and forth together with the drive cable while being disabled to vertically rock with respect to the main guide rails 12. Moreover, when the front edge of the sliding roof 2 is positioned adjacent to the front edge of the roof opening 3, the aforementioned bent rear end portion 22a is positioned in the recess 12a of the main guide rails 12 so that the slide pin 23 slides within the guide groove 22.

The sliding roof 2, roof side guide rails 5, front slide stays 6 and main guide rails 12 thus far described constitute together a sliding roof device 24, which is so formed as to change the angle of inclination of the sliding roof 2 as it moves backward so that the rear portion 2a of the sliding roof 2 may come close to the roof back 1a when in the fully open state of the sliding roof 2.

On the aforementioned link member 21 of the sliding roof device 24 thus constructed, there is mounted an elastic member 31 of rubber cushion or the like, which is positioned below the arms 6a of the front slide stays 6.

Figure 4:
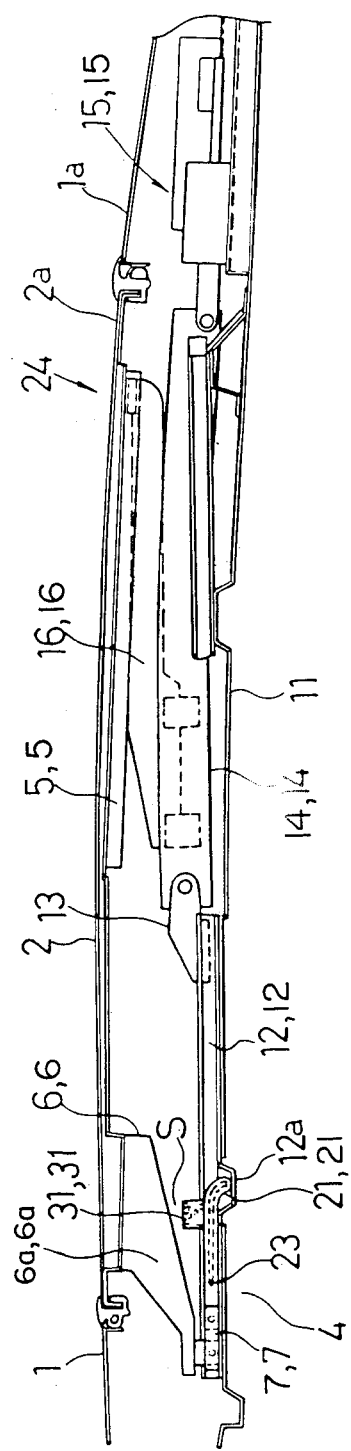
FIGS. 4 to 6 are side views showing the sliding roof devices in the fully closed, tilted-up and fully open states of the sliding roof, respectively.

The vertical thickness of the aforementioned elastic member 31 is set to hold a predetermined gap S from the arms 6a when the sliding roof 2 is in the fully closed and tilted-up states, as shown in FIGS. 4 and 5. Moreover, when the sliding roof 2 is moved backward from its tilted-up state, the aforementioned gap S is gradually reduced by the changes in the inclination of the front slide stays 6 and in the level of the main guide rails 12 until it disappears when the sliding roof 2 comes to the vicinity of its fully open state, so that the elastic member 31 is compressed to push and bias the arms 6a upward.

With the construction thus far described, according to the present invention, when the sliding roof 2 is fully open, its front portion is pushed and biased upwardly by the elastic member 31, and its support is further strengthened by the additional action of the front slide stays 6 and the rear slide stays 16 so that the device can reduce chattering so that it is as small as possible when the automobile is running or in motion.

Incidentally, in the embodiment as discussed above, the elastic member 31 is interposed between the front slide stays 6 and the link member 21. However, the mounting position of the elastic member should not be limited to the aforementioned one but may be so selected between the sliding roof 2 and the frame member 11 that the elastic member 31 is compressed when the sliding roof 2 is fully open.

As has been described hereinbefore, according to the present invention, there can be attained a number of excellent results in that the construction of the sliding roof device is made stronger when in its fully open state to make the chattering of the device in the fully open state as small as possible thereby to drastically enhance the practicability of the sliding roof device. Further, the construction of the present invention is simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A sliding roof device for a vehicle having a roof with an opening being disposed therein comprising:
a sliding roof operatively positioned to close the opening in the roof of the vehicle, said sliding roof including a front surface, a rear surface, an upper face and a lower face;
a roof frame;
frame side guide rails mounted on said roof frame and having a first end and a second end, said first end being positioned at a lower elevation relative to the roof opening than said second end;
front slide stays secured to the front surface and lower face of the sliding roof;
front moving members attached to said front slide stays and operatively positioned to be movable back and forth along said frame side guide rails;
sub guide rails mounted on said roof frame;
rear slide stays secured to the rear surface and lower face of the sliding roof;
rear moving members attached to said rear slide stays and operatively positioned to be movable back and forth along said sub guide rails;
wherein upwardly tilting the rear surface of said sliding roof and displacing said sliding roof to a roof back position with said front moving members being guided and elevated along said frame side guide rails from said first end towards said second end varies the angle of inclination of said sliding roof relative to said opening in the roof of the vehicle while displacing the rear surface of the sliding roof downwardly; and
an elastic member operatively positioned between said sliding roof and said roof frame and being adapted to be compressed by said sliding roof when said roof is fully opened to push and bias said sliding roof upwardly.

2. A sliding roof device according to claim 1, wherein said elastic member is disposed on said front moving members and below said front slide stays.

3. A sliding roof device according to claim 1, and further including a link member operatively connected to each of said front moving members, said elastic member being affixed to said link member to push and bias said sliding roof upwardly when in the fully opened position.

4. A sliding roof device according to claim 1, and further including a tilt-up mechanism operatively connected to said sub guide rails for changing the elevation of said sub guide rails relative to opening in the roof of the vehicle.

5. A sliding roof device for a vehicle having a roof with an opening being disposed therein comprising:
a sliding roof operatively positioned to close the opening in the roof of the vehicle, said sliding roof including a front surface, a rear surface, an upper face and a lower face;
a roof frame;
tilt-up means for tilting the rear surface of said sliding roof;
frame side guide rails including main guide rails and sub guide rails mounted on said roof frame;
said main guide rails having a first end and a second end, said first end being positioned at a lower elevation relative to said second end in relation to the roof opening, said sub guide rails being adapted to be rearwardly tilted upward, front and rear slide stays mounted on the lower face and both sides of said sliding roof;
said front slide stays being guided along said main guide rails;
said rear slide stays being guided along said sub guide rails and being inclined at an angle to be rearwardly elevated when the sliding roof is in the tilted position in such a manner that the rearward displacement of the sliding roof causes the inclination angle of the rear slide stays to decrease;

moving members attached to said front and rear slide stays and operatively positioned to be movable back and forth along said frame side guide rails wherein upwardly tilting the rear surface of said sliding roof and displacing said sliding roof to a roof back position with said moving members being guided and elevated along said frame side guide rails varies the angle of inclination of said sliding roof relative to said opening in the roof of the vehicle while displacing the rear surface of the sliding roof downwardly; and an elastic member operatively positioned between said sliding roof and said roof frame and being adapted to be compressed by said sliding roof when said roof is fully opened to push and bias said slding roof upwardly.

6. A sliding roof device for a vehicle according to claim 5, wherein said sub guide rail is arcuately formed to curve upwardly.

* * * * *